United States Patent [19]

Sekerich

[11] 4,006,945
[45] Feb. 8, 1977

[54] ROLLER BEARING ASSEMBLY

[75] Inventor: Michael Sekerich, Spring Valley, N.Y.

[73] Assignee: Buildex Incorporated, West Nyack, N.Y.

[22] Filed: Mar. 6, 1975

[21] Appl. No.: 555,793

[52] U.S. Cl. .................. 308/191; 29/148.4 A; 29/511; 308/3.8; 308/18
[51] Int. Cl.² ........................................ F16C 33/00
[58] Field of Search ............... 308/3.6, 3.8, 6, 191, 308/8, 207, 18, DIG. 7, 195, 207 R; 29/148.4 A, 511; 16/98, 106, 107

[56] References Cited

UNITED STATES PATENTS

| 878,652 | 2/1908 | Matthews | 308/195 |
|---|---|---|---|
| 3,451,730 | 6/1969 | Krispinsky et al. | 308/3.8 |
| 3,469,892 | 9/1969 | Langstroth | 308/3.8 |
| 3,625,575 | 12/1971 | Darnell | 308/3.8 |

Primary Examiner—Joseph F. Peters
Assistant Examiner—Richard A. Bertsch
Attorney, Agent, or Firm—Howard C. Miskin

[57] ABSTRACT

A roller assembly includes a base plate having an opening, a tubular outer race member formed of polymeric resin and a coaxial tubular inner race member formed of metal. The outer race member is open at its distal end and is provided with an annular proximal end wall adjacent the base plate having its central opening coaxial with the base plate opening and a forwardly directed lip along its inner front border. The inner race member has a distal flange registering with the outer race member distal end and a tubular proximal section projecting through the end wall and base plate openings and having its end upset into engagement with the rear borders of the base plate opening. In producing the assembly bearing, balls are deposited onto the inside face of the outer race member end wall with its distal end uppermost, the inner race member is inserted into the outer race member to entrap the balls between their confronting faces and to bring its proximal end through the registering coaxial openings in the end wall and base plate, and then the end of the proximal end is upset to lock and secure the assembly.

7 Claims, 3 Drawing Figures

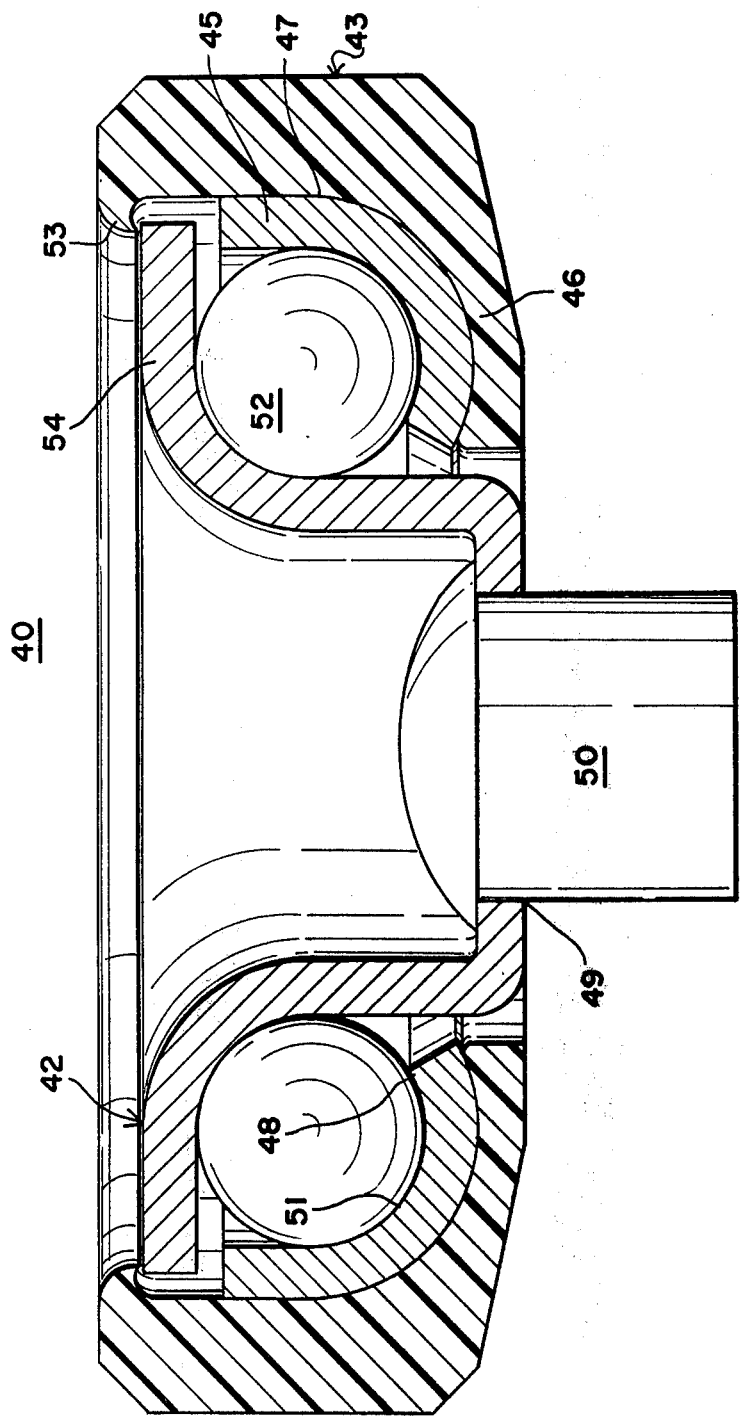

ROLLER BEARING ASSEMBLY

BACKGROUND OF THE INVENTION

The present invention relates generally to improvements in roller structures and it relates more particularly to an improved ball bearing roller assembly highly useful for the support of sliding drawers and the like.

In many types of cabinet and furniture structures sliding drawers and the like are provided and these are frequently supported, either directly or usually by way of track members, by ball bearing rollers. Each of the sliding drawer supports generally includes a plurality of such rollers and the conventional ball bearing roller employed in this connection and those heretofore proposed possesses numerous drawbacks and disadvantages. They are expensive devices and their proper assembly and mounting and securement are time consuming and require a high degree of skill and hence contribute greatly to the cost of the end product, they are of little versatility and adaptability and otherwise leave much to be desired.

SUMMARY OF THE INVENTION

It is a principal object of the present invention to provide an improved low cost roller device and an improved method for producing the same.

Another object of the present invention is to provide an improved ball bearing roller device which is assembled in position and an improved method for fabricating such device automatically.

Still another object of the present invention is to provide an improved ball bearing roller device and mount which is low cost, simple to produce, and highly useful for supporting sliding drawers and the like.

A further object of the present invention is to provide a device and method of the above nature characterized by their economy, simplicity, reliability, great versatility and adaptability, and ease and convenience of application.

The above and other objects of the present invention will become apparent from a reading of the following description taken in conjuction with the accompanying drawing which illustrates a preferred embodiment thereof.

In a sense, the present invention contemplates the provision of an improved ball bearing roller assembly utilizing a minimum of parts comprising a base member, a roller defining tubular outer race member having an annular or centrally apertured proximate end wall proximate the base member and being open at its opposite or distal end and having an outer race defining inside peripheral face, an inner race member coaxial with the outer race member and having an inner face defining peripheral outside face confronting and spaced from the outer race and provided with an outwardly directed peripheral flange at its distal end registering with the distal end opening of the outer race member and a locking section extending through the end wall opening and secured to the base member to lock, support and form the roller assembly, with a plurality of bearing balls entrapped between the races and the flange and end wall. The improved method of producing the roller assembly includes the steps of depositing the balls on the inside face of the inner race member end wall with the distal open end of the race member being uppermost, then inserting the inner race member into the outer race member with the flange uppermost and the locking section projecting through the end wall opening and thereafter securing the locking section to the base member to lock the assembly.

In the preferred form of the ball bearing roller assembly the outer race member is formed of nylon or other polymeric resin and the inner edge of the annular end wall thereof is provided with a forwardly projecting peripheral lip which serves, among others, the function of retaining the balls on the end wall during the assembly of the roller device. The base member is in the form of a plate having an opening in coaxial registration with the race member end wall opening. The inner race member is formed of metal and is tubular, the locking section projecting through the base plate opening and having its end upset to form a bead or flange which tightly engages the rear border of the base plate opening.

The improved ball bearing roller by using simple shaped members which cooperate with each other, is reliable, simple, rugged and inexpensive, is of great versatility and adaptability and is easily, rapidly and conveniently assembled and mounted by the improved method which may be practiced with simple and economical automatic equipment.

BRIEF DESCRIPTION OF THE DRAWING

FIG. 3 is a medial longitudinal sectional view of another embodiment of a bearing device embodying the present invention.

DESCRIPTION OF THE PREFERRED EMBODIMENT

Figure 1:
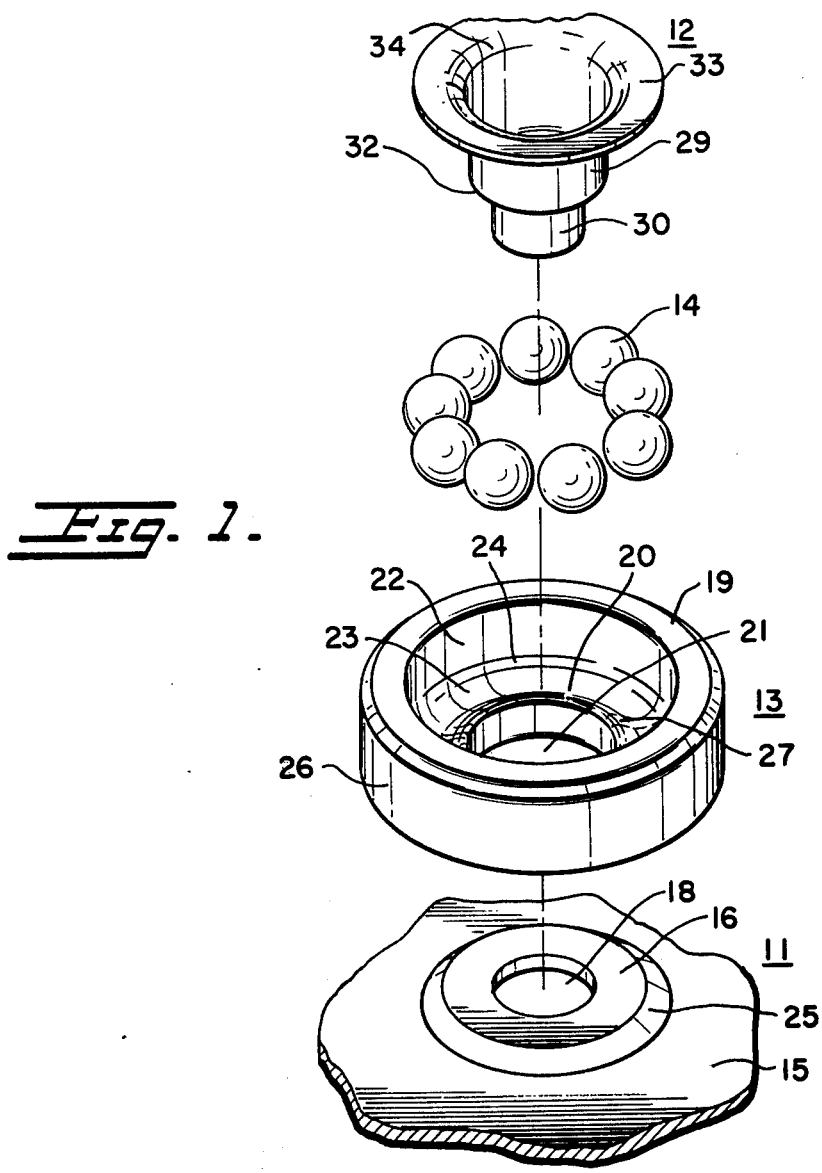
FIG. 1 is an exploded perspective view of a ball bearing roller device embodying the present invention.
Figure 2:
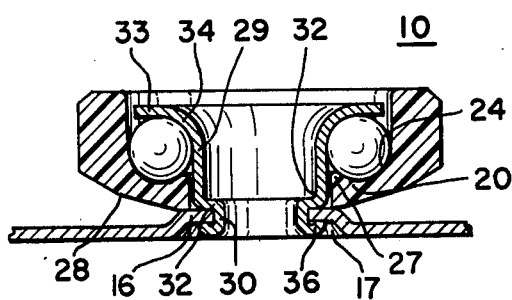
FIG. 2 is a medial longitudinal sectional view thereof in assembled condition.

Referring now to FIGS. 1 and 2 of the drawing, which illustrate a preferred embodiment of the present invention, the reference numeral 10 generally designates the improved ball bearing roller device which includes a base member 11, inner and outer race members 12 and 13 respectively and a group or plurality of bearing balls 14. The base member 11 includes a metal plate 15 which may be a mounting plate, bracket or the like and is provided with a flat circular raised portion 16 backed by a recess 17, a circular opening 18 being centrally formed in raised portion 16 which is surrounded by a depending outwardly inclined skirt wall 25.

The outer race member 13 defines the roller, per se, and is advantageously formed of a low friction highly abrasive resistant synthetic organic polymeric resin such as nylon or the like and is preferably produced by injection molding. The outer race member 13 is of tubular configuration and includes a peripheral cylindrical wall 19 open at its top or distal end and provided at its bottom or proximal end with an annular end wall 20 having a central circular opening 21 of a diameter between that of base member raised section 16 and opening 18. The inside peripheral face 22 of peripheral wall 19 joins the top or forward face 23 of end wall 20 by a concave arcuate face 24 which with face 22, defines an outer race, the radius of curvature of face 24 being greater than those of balls 14. The outside face 26 of wall 19 is cylindrical.

Formed along the forward inside border of end wall 20 surrounding the opening 21 is a forwardly projecting peripheral lip 27 having a concave outer face preferably of the curvature of face 24. The outer or proximal face 28 of end wall 20 is generally convex and radially angulated, its border coaxially resting on the outer border of the top face of raised base portion 16.

The inner race member 12 is tubular and is integrally formed of any suitable material. Race member 12 includes a distal main cylindrical section 29 and a relatively short securing cylindrical section 30 of lesser diameter than and coaxial with main section 29 and joined thereto by an annular flange 32 having a downwardly facing horizontal peripheral shoulder. The main section 29 terminates at its distal end in an outwardly directed peripheral flange 33 joined to main section 29 by an arcuate corner 34 having a concave inside face similar to but opposite face 24 of race member 13. The outside face of main section 29 is cylindrical and of lesser diameter and coaxial with face 22 of wall 19 of race 13 and with the rear face of flange 33 defining an inside race.

In the assembled condition of the roller device 10, the proximal end of inner race member 12, main section 29 registers with outer race member opening 21 and securing section 30 projects through base member opening 18 and its free end is upset to form a peripheral bead or flange 36 engaging the underface of base raised portion 16 bordering the opening 18, so that the base member 11 is tightly and firmly embraced between peripheral flanges 32 and 36. Hence, inner race member 12 and base member 11 are fixed.

The balls 14 extend around the inner race member main section 29 and are entrapped between the confronting race defining faces of the inner and outer race members 12 and 13 and provides a freely rotatable surface for the roller defining outer race member 13 on the support defining inner race member 12. The ball retaining surfaces are provided by facing smooth surfaces 22 and 29 and the facing curved surfaces 24 and 34. These cooperating surfaces allow easy and fast assembly and simple part forming operations.

In assembling the improved roller device 10, the outer race member 13 is held substantially horizontal overlying base plate 15 with open end of outer race member 13 facing uppermost and the group of balls 14 are deposited through the open end onto the top face 23 of annular end wall 20, the balls 14 being retained in their proper position by the peripheral lip 27. The inner race member 12 with the flange 33 uppermost, is then coaxially inserted into the outer race member and the receiving section 30 thereof is advanced through the base place opening 18 to bring the flange 32 into engagement with the top face of the border of opening 18, in which position the bottom portion of inner race main section 29 registers with the slightly larger diameter opening 21 in the end wall 20 of outer race 13 and the end wall periphery around opening 18 rests along its inner bottom border on the outer border of base raised portion 16 and spaced from the outer periphery of flange 32. Thereafter that portion of the receiving section 30 projecting below the opening 18 of base member 11 is outwardly upset with any suitable tool to form flange or bead 36 and tightly embrace the raised portion 16 bordering opening 18 between flanges 32 and 26. The roller device 10 is thus locked in its assembled position and securely mounted to the base member 11. Outer race 13 rotates about inner race 12. While the improved method may be manually practiced, it is readily and easily adapted to automatic equipment of a simple nature.

Another embodiment of the present invention is illustrated in FIG. 3 where numeral 40 designates a bearing assembly. Assembly 40 has inner and outer members 42 and 43 respectively. Outer tire member 43 is generally similar in material and construction to member 13 in the first described embodiment. Advantageously, for heavier duty applications, a metal ring 45 is affixed to inner surfaces of annular end wall 46 and peripheral face 47 of member 43, such as by ultrasonic insertion or adhesive or the like to form the outer race. Ring 45 has an inner concave surface 51 with a peripheral lip 48.

Inner race member 42 is generally similar in construction to member 12 of the first mentioned embodiment but does not have securing section 30 and instead has a bore 49 through which passes a rivet or other type of fastener 50. A plurality of bearing balls 52 are entrapped between the confronting surfaces of inner peripheral face 51 of outer race 45 and inner race 42. To temporarily retain inner race member 42, balls 52 and outer tire member 43, the plastic outer upper end 53 of tire member 43 is deformed over the outer peripheral edge of flange 54 of inner member 42.

Assembly 40 is assembled in a manner similar to that described above with the differences noted above. Rivet 50 is positioned through the opening of the base, not shown, and upset in any convenient manner.

If inner member 42 or 12 are hardened, such as for heavy duty uses, it becomes difficult to upset end 30 or subsequently form it, which requires the use of rivet 50 or other type of fastener. While the second discussed embodiment uses ring 45, it is not necessary.

It is seen that the cooperating mating, coaxial facing, cylindrical surfaces of the inner and outer members provide easy assembly and readily conform to fit the balls. During assembly the balls are positioned and held on the outer member's surface essentially by gravity and the outer peripheral lip and the inner race member positioned also by gravity. The assembly is quick and easy and once the components are assembled, the bearing is completed and formed as the unit is mounted in place.

While there have been described and illustrated preferred embodiments of the present invention, it is apparent that numerous alterations, omissions and additions may be made without departing from the spirit thereof.

What is claimed is:

1. A roller assembly comprising a base member, a roller defining tubular outer race member having a centrally apertured proximal end wall proximate said base member and being open at its distal end and having an outer race defining inside peripheral face, an inner race member coaxial with said outer race member and having an inner race defining peripheral outside face confronting and spaced from said outer race and provided with an outwardly directed peripheral flange at its distal end registering with the distal end opening of said outer race member and locking means extending through said proximal end wall opening of said outer race and secured to said base member to lock the roller assembly, and a plurality of bearing balls entrapped between said inner and outer races and said flange and end wall, said base member comprising a plate having an opening coaxial with said end wall aperture and said inner race member being of tubular configuration and including a cylindrical distal section terminating in said flange at its distal end and projecting into said end wall aperture and a cylindrical proximal section of a diameter less than that of said distal section and joined to said distal section by a peripheral shoulder engaging the forward peripheral border of said base member opening, the end of said proximal section being upset into engagement with the rear peripheral border of said base member.

2. The roller assembly of claim 1 wherein the end wall of said outer member includes a forwardly projecting lip extending peripherally along the forward inner border.

3. The roller assembly of claim 1 wherein said outer race member is integrally formed of a synthetic organic polymeric resin and said outer race member is integrally formed of metal.

4. The roller assembly of claim 1 further including a metal ring having a concave inner curvature affixed to the inside peripheral face of said outer race member.

5. The roller assembly of claim 1 wherein the end wall of said outer member includes a forwardly projecting lip extending peripherally along the forward inner border.

6. The method of producing a roller assembly comprising a base member, a roller defining tubular outer race member having a proximal end wall proximate said base member and having an inside cylindrical surface defining an outer race, a one piece inner race member coaxial with said outer race member and having a peripheral outside face defining an inner race spaced from said outer race provided with a peripheral flange at its distal end registering with the distal end opening of said outer race member, locking means extending through said proximal end wall opening of said outer race and secured to said base member to lock the roller assembly, and a plurality of bearing balls entrapped between said inner and outer races and said inner race end flange and outer race end wall, comprising the steps of forming the outer race member with a smooth inside cylindrical surface and the proximal end wall with a central aperture and open at its opposite end, positioning the outer race member with its open end uppermost, depositing said bearing balls onto the inside face of said outer race member end wall, and then inserting said inner race member into said outer race member and projecting the proximal end thereof through said end wall aperture and securing it to said base member.

7. The method of producing a roller assembly comprising a base member, a roller defining tubular outer race member having a centrally apertured proximal end wall proximate said base member and being open at its distal end and having an outer race defining inside peripheral face, an inner race member coaxial with said outer race member and having a peripheral outside face defining an inner race spaced from said outer race and provided with an outwardly directed peripheral flange at its distal end registering with the distal end opening of said outer race member, locking means extending through said proximal end wall opening of said outer race and secured to said base member to lock the roller assembly, and a plurality of bearing balls entrapped between said inner and outer races and said flange and end wall, said base member comprising a plate having an opening coaxial with said end wall aperture and said inner race member being of tubular configuration and including a cylindrical distal section terminating in said flange at its distal end and projecting into said end wall aperture and a cylindrical proximal section of a diameter less than that of said distal section and joined to said distal section by a peripheral shoulder, engaging the forward peripheral border of said base member opening, the end of said proximal section being upset into engagement with the rear peripheral border of said base member, comprising the steps of depositing said bearing balls onto the inside face of said outer race member end wall with said outer race member being positioned with its open end uppermost, inserting said inner race member into said outer race member and the proximal section thereof into said base plate opening and then upsetting the end of said proximal section into engagement with the bottom border of said base member opening.

* * * * *